United States Patent
Fujii (10) Patent No.: US 7,894,187 B2
(45) Date of Patent: Feb. 22, 2011

(54) PORTABLE ELECTRONIC APPARATUS

(75) Inventor: Tomohiro Fujii, Tokyo (JP)

(73) Assignee: NEC Corporation, Tokyo (JP)

( * ) Notice: Subject to any disclaimer, the term of this patent is extended or adjusted under 35 U.S.C. 154(b) by 98 days.

(21) Appl. No.: 12/514,642

(22) PCT Filed: Oct. 25, 2007

(86) PCT No.: PCT/JP2007/001170

§ 371 (c)(1),
(2), (4) Date: May 13, 2009

(87) PCT Pub. No.: WO2008/059611

PCT Pub. Date: May 22, 2008

(65) Prior Publication Data

US 2010/0053860 A1    Mar. 4, 2010

(30) Foreign Application Priority Data

Nov. 13, 2006  (JP)  ............... 2006-306403

(51) Int. Cl.
H05K 7/00 (2006.01)
H04M 1/00 (2006.01)
H04B 1/38 (2006.01)
H05K 7/14 (2006.01)

(52) U.S. Cl. ............... 361/679.57; 361/679.55; 361/679.56; 361/679.58; 455/575.1; 455/575.2; 455/573; 174/535

(58) Field of Classification Search ...............
361/679.55–679.59, 679.01–679.19, 679.41–679.45; 345/156, 157, 168, 169, 184; 455/325, 556.1, 455/550.1, 90.1, 575.1; 369/282, 291, 253, 369/44.16, 75.5; 70/357, 367, 406, 381, 70/491; 200/329; 174/535; 29/557
See application file for complete search history.

(56) References Cited

U.S. PATENT DOCUMENTS

2001/0021657 A1 * 9/2001 Morita ............... 455/550
2008/0316684 A1 * 12/2008 Kilpinen ............... 361/679

FOREIGN PATENT DOCUMENTS

| JP | 1996129531 A | 5/1996 |
|---|---|---|
| JP | 3037108 B | 2/1997 |
| JP | 2000049917 A | 2/2000 |
| JP | 2002185587 A | 6/2002 |
| JP | 2003044793 A | 2/2003 |
| JP | 2004032527 A | 1/2004 |
| JP | 2004193016 A | 7/2004 |

OTHER PUBLICATIONS

International Search Report for PCT/JP2007/001170 mailed Jan. 15, 2008.

\* cited by examiner

*Primary Examiner*—Jayprakash N Gandhi
*Assistant Examiner*—Jerry Wu (57) ABSTRACT

When a unit lock member (130) is engaged with a SIM card (220) mounted in a unit retention mechanism (120), a battery pack (210) can be mounted or removed. When the battery pack (210) is removed, the unit lock member (130) is permitted to slide thereby enabling mounting or removing the SIM card (220). Thus, the SIM card (220) cannot be mounted or removed while the battery pack (210) is mounted. Still, the battery pack (210) and the SIM card (220) are separately located in a plane, and hence a terminal main body (110) can be made thinner, and the presence of the SIM card (220) can be confirmed without the need to remove the battery pack (210).

8 Claims, 6 Drawing Sheets

PORTABLE ELECTRONIC APPARATUS

This application is the National Phase of PCT/JP2007/001170, filed Oct. 25, 2007, which is based upon and claims priority from Japanese Patent Application No. 2006-306403 filed Nov. 13, 2006.

TECHNICAL FIELD

The present invention relates to a portable electronic apparatus having a structure that allows removably mounting a battery pack and an electronic card medium on a main body of the electronic apparatus.

BACKGROUND ART

Some of currently available portable electronic apparatuses, such as so-called mobile phones, are designed such that a SIM card, which is an electronic card medium constituted of a card-shaped electronic device, can be removably mounted thereon, in addition to a battery pack. Such portable electronic apparatus includes a battery retention mechanism and a card socket serving as a unit retention mechanism, formed on the main body of the electronic apparatus.

In the card socket the SIM card is removably mounted, and in the battery retention mechanism the battery pack is removably mounted. However, mounting or removing the SIM card while the power is on may incur a malfunction.

To prevent such accident, for example, the card socket in which the SIM card is removably mounted from above is located on a bottom portion of the battery retention mechanism, in which the battery pack is removably mounted from above, in conventional portable electronic apparatuses.

Such portable electronic apparatus allows mounting the battery pack only after mounting the SIM card, and removing the SIM card only after removing the battery pack. Accordingly, the malfunction of the SIM card can be prevented.

Various proposals can be currently found regarding the foregoing portable electronic apparatus, as exemplified by patented documents 1 to 4.

[Patent document 1] JP-A No. 2000-049917
[Patent document 2] JP-A No. 2004-032527
[Patent document 3] JP-A No. H08-129531
[Patent document 4] JP-U No. 3037108

DISCLOSURE OF THE INVENTION

Problem to be Solved by the Invention

In the foregoing portable electronic apparatus, however, the battery pack is vertically superposed on the SIM card. Such structure impedes reducing the thickness of the apparatus main body of the portable electronic apparatus in which the SIM card and the battery pack are accommodated.

In particular, the mobile phones that have lately gained popularity have the main body divided into two bodies, folded over each other or slidable relative to each other. Naturally, each of the divided main bodies of such portable electronic apparatus is required to be significantly thinner.

Accordingly, in the case of the folding type or sliding type portable electronic apparatus, it is not preferable to vertically superpose the battery pack on the SIM card as above, in the main body of the electronic apparatus.

Besides, locating the battery pack so as to hide the SIM card inhibits confirming the presence of the SIM card without the need to remove the battery pack. Such structure degrades the maintenance work efficiency.

The present invention has been accomplished in view of the foregoing problem, and provides a portable electronic apparatus configured so as to inhibit mounting or removing the electronic card medium while the battery pack is mounted, which yet allows reducing the thickness of the main body of the electronic apparatus, and also confirming the presence of the electronic card medium without the need to remove the battery pack.

Means for Solving Problem

According to the present invention, there is provided a portable electronic apparatus including a battery pack and an electronic card medium constituted of a card-shaped electronic device, removably mounted on a main body of the electronic apparatus, comprising a unit retention mechanism in which the electronic card medium is slide-mounted from one of left and right direction; a unit lock member supported so as to slide in a back and forth direction, and to be engaged with at least an end face on either side of the electronic card medium mounted; and a battery retention mechanism in which the battery pack is removably mounted from above, at a position where the battery pack holds immobile the unit lock member engaged with the electronic card medium.

In the portable electronic apparatus according to the present invention, therefore, the battery pack is removably mounted at such a position that the battery pack holds immobile the unit lock member, when the unit lock member is engaged with the electronic card medium mounted in the unit retention mechanism. When the battery pack is removed the unit lock member can freely slide, so as to be disengaged from the electronic card mediums thereby allowing the electronic card medium to be removed.

It is to be noted that each constituent of the present invention has only to be capable of performing its function, and may be constituted in a form of, for example, an exclusive hardware that performs a predetermined function, a data processor in which a predetermined function is incorporated as a computer program, a predetermined function realized in a data processor by a computer program, and an optional combination thereof.

Also, the constituents of the present invention do not necessarily have to be individually independent, but may be configured such that a plurality of constituents constitutes a single member, that a constituent is composed of a plurality of members, that a constituent is a part of another constituent, that a part of a constituent and a part of another constituent overlap, and so forth.

Further, although the present invention designates a back and forth, left and right, and up and down direction as the case may be, this is merely for convenience sake for explicitly explaining a relative positional relationship between the constituents of the present invention. Accordingly, such expression is not intended to determine a direction in manufacturing the product embodying the present invention, or in use thereof.

Advantage of the Invention

The portable electronic apparatus according to the present invention inhibits mounting or removing the electronic card medium, while the battery pack can be removably mounted. Such configuration prevents the malfunction of the electronic card medium arising from being mounted or removed while the battery pack is mounted. Still, the battery pack and the electronic card medium can be independently located in a plane. The main body of the electronic apparatus can therefore be made thinner. Such structure further allows confirming whether the electronic card medium is mounted, without the need to remove the battery pack.

BRIEF DESCRIPTION OF THE DRAWINGS

The above and other objects, features and advantages will become more apparent through a preferred embodiment described hereunder and the following accompanying drawings.

BEST MODE FOR CARRYING OUT THE INVENTION

An embodiment of the present invention will be described hereunder, referring to FIGS. 1 to 5. The description of the embodiment designates a back and forth, left and right, and up and down direction according to the drawings. However, this is merely for convenience sake for explicitly explaining a relative positional relationship between the constituents of the present invention. Accordingly, such expression is not intended to determine a direction in manufacturing the product embodying the present invention, or in use thereof.

Figure 1:
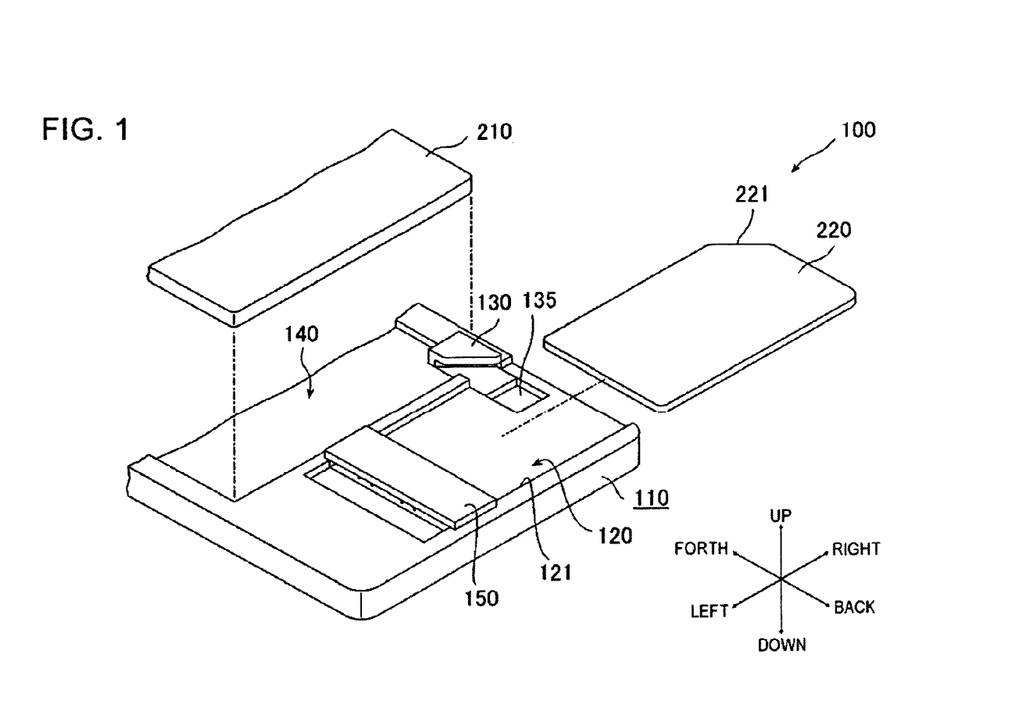
FIG. 1 is an exploded perspective view showing a part of an electronic device main body of a mobile phone terminal, which is a portable electronic apparatus according to an embodiment of the present invention.

As shown in FIG. 1 and others, in a mobile phone terminal 100, representing the portable electronic apparatus according to this embodiment, a battery pack 210 and a SIM card 220, which is an electronic card medium constituted of a card-shaped electronic device, are removably mounted on a terminal main body 110 constituting the main body of the electronic apparatus.

Accordingly, the mobile phone terminal 100 includes a unit retention mechanism 120 in which the SIM card 220 is slide-mounted from one of left and right direction, a unit lock member 130 supported so as to slide in a back and forth direction, and to be engaged with at least an end face on either side of the SIM card 220 mounted, and a battery retention mechanism 140 in which the battery pack 210 is removably mounted from above, at a position where the battery pack 210 holds immobile the unit lock member 130 engaged with the SIM card 220.

To be more detailed, the mobile phone terminal 100 is formed in what is known as a folding type, such that a first terminal main body (not shown) including a speaker unit, a display unit and so forth and a second terminal main body 110 including a microphone unit, a keyboard unit and so on are connected via a hinge mechanism (not shown).

On an outer face of the second terminal main body 110, and in a region closer to the distal end thereof, the unit retention mechanism 120 and the battery retention mechanism 140 are provided. In the practically manufactured mobile phone terminal 100, naturally, a back cover (not shown) is removably attached on the outer face on the side of the distal end of the second terminal main body 110, to thereby conceal the unit retention mechanism 120 and the battery retention mechanism 140.

The SIM card 220 is of a rectangular plate shape, with a corner 221 on one of the end portions cut away in a triangular shape. The SIM card 220 is oriented such that the corner 221 is located right-hand forward, and thereby mounted in the unit retention mechanism 120 from the right.

Figure 5:
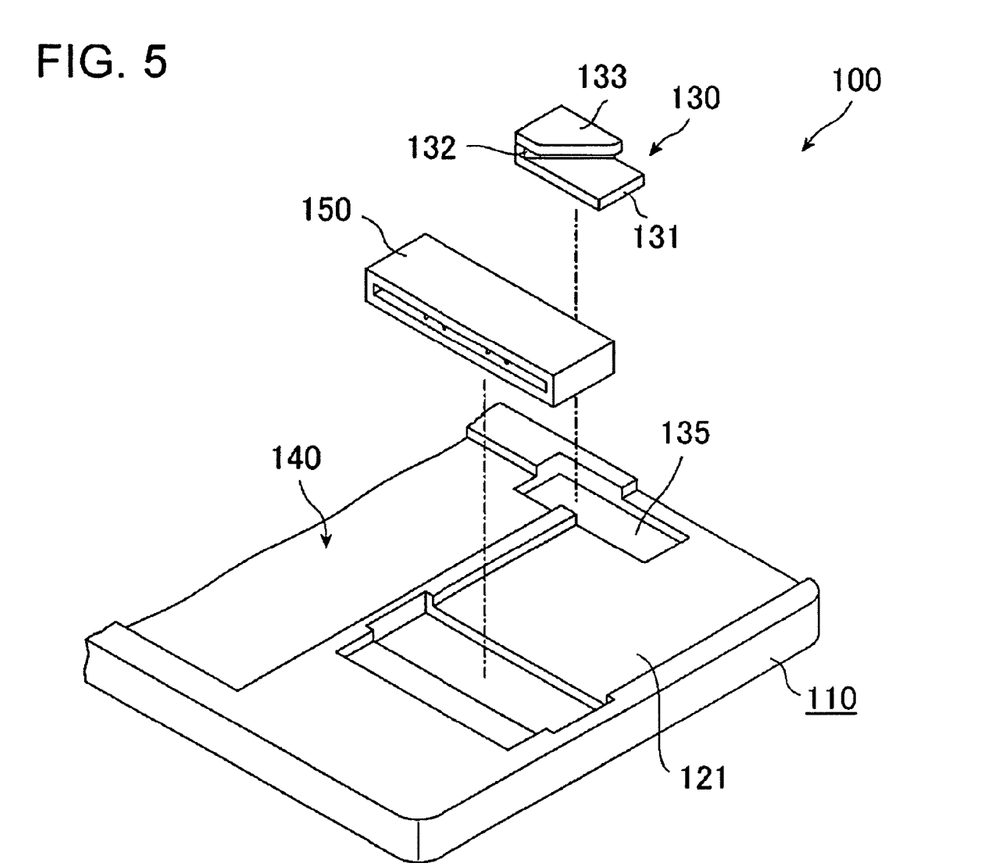
FIG. 5 is an exploded perspective view showing the structure of a part of the electronic device main body.

The unit retention mechanism 120 includes a rectangular recessed portion 121 formed on the outer face on the side of the distal end of the second terminal main body 110, with an opening formed on the right-hand side. The recessed portion 121 further includes a connector unit 150 for electrical connection with the SIM card 220 mounted, as shown in FIG. 5. The connector unit 150 is of a frame-like shape through which the SIM card 220 is inserted, and acts as a part of the unit retention mechanism 120.

The unit lock member 130 includes a bottom portion 131 of a slender rectangular plate shape extending in a back and forth direction, a middle portion 132 of a triangular plate shape, to be butted to the end face of the corner 221 of the SIM card 220, and a top portion 133 of a triangular plate shape projecting further backward from the middle portion 132.

Thus, the unit lock member 130 is formed so as to be engaged with the corner 221 of the SIM card 220 cut away in a triangular shape, thus to be engaged with the right-hand end face, as well as with the right-hand upper and lower surface of the SIM card 220.

The unit lock member 130 thus configured is supported so as to slide back and forth, by a recessed groove 135 formed on the outer face on the side of the distal end of the terminal main body 110. Although FIG. 5 only shows the shape of the bottom portion 131, the middle portion 132 and the top portion 133 of the unit lock member 130, actually the unit lock member 130 is mounted in the recessed groove 135 so as not to come off therefrom in an upper direction, and only to slide back and forth.

The battery pack 210 is a flat rectangular parallelepiped larger than the SIM card 220. The battery retention mechanism 140 is provided in a form of a recessed portion on the outer face of the terminal main body 110.

In the mobile phone terminal 100 according to this embodiment, the recessed groove 135 slidably supporting the unit lock member 130 is located over a region including a right-hand frontal portion of the unit retention mechanism 120 and a right-hand rear portion of the battery retention mechanism 140. Accordingly, the battery pack 210 is located, upon being removably mounted from above, so as to hold immobile the unit lock member 130 engaged with the SIM card 220.

With the foregoing structure of the mobile phone terminal 100 according to this embodiment, the battery pack 210 and the SIM card 220 can be removably mounted, as shown in FIGS. 1 to 4.

Figure 3:
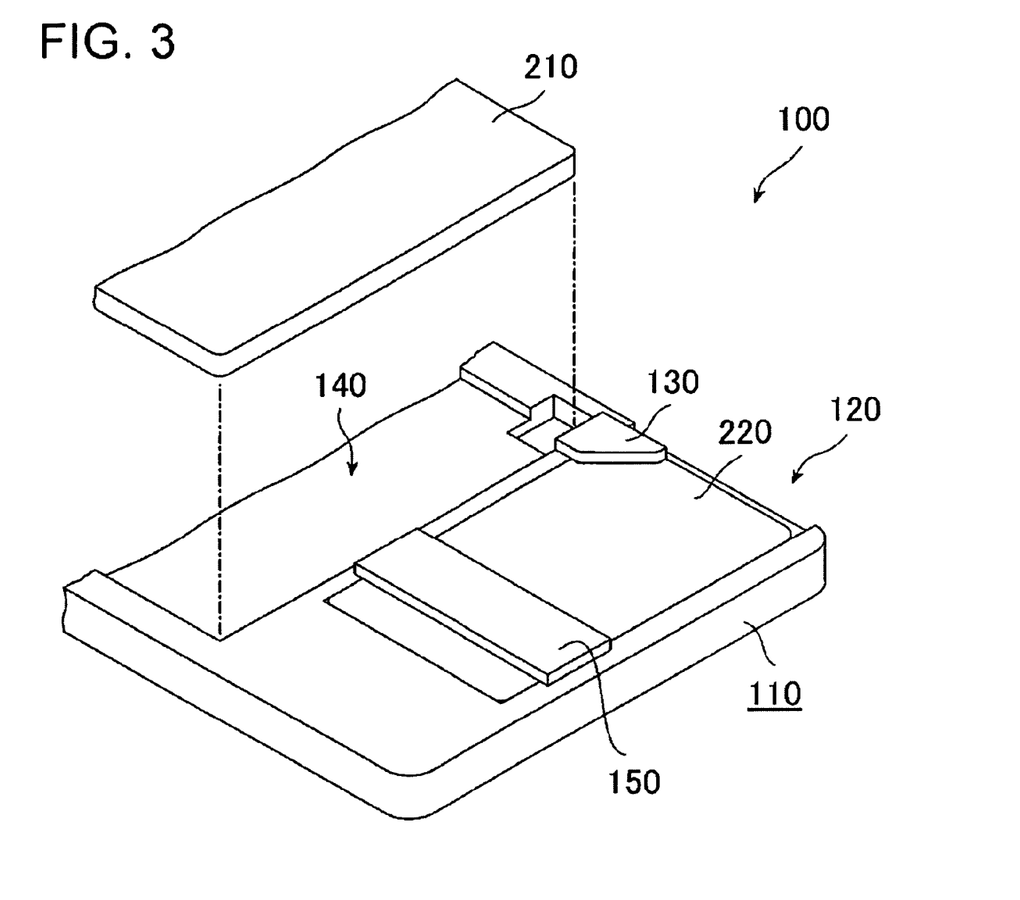
FIG. 3 is an exploded perspective view showing the SIM card engaged with a unit lock member.
Figure 4:
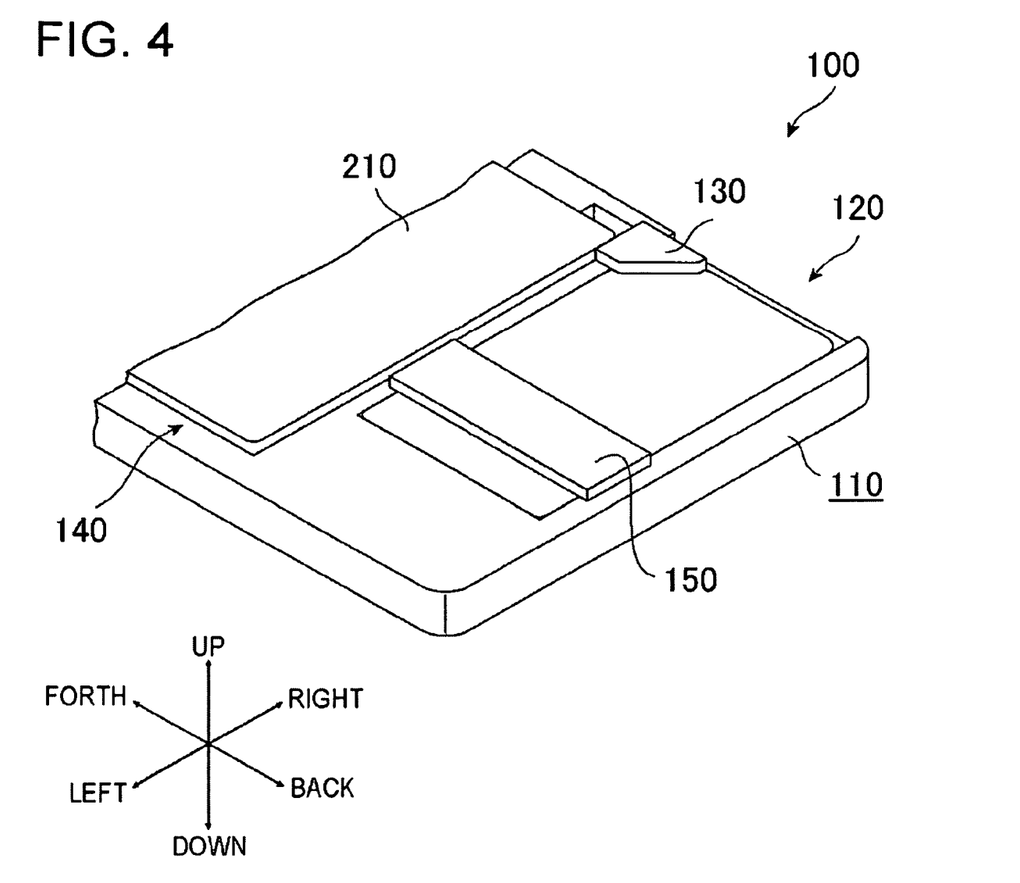
FIG. 4 is a perspective view showing the electronic device main body with the battery pack mounted thereon.

In doing so, in the case where the unit lock member 130 is engaged with the SIM card 220 mounted in the unit retention mechanism 120 as shown in FIG. 3, the battery pack 210 can be removably mounted, at a position where the battery pack 210 holds immobile the unit lock member 130.

Figure 2:
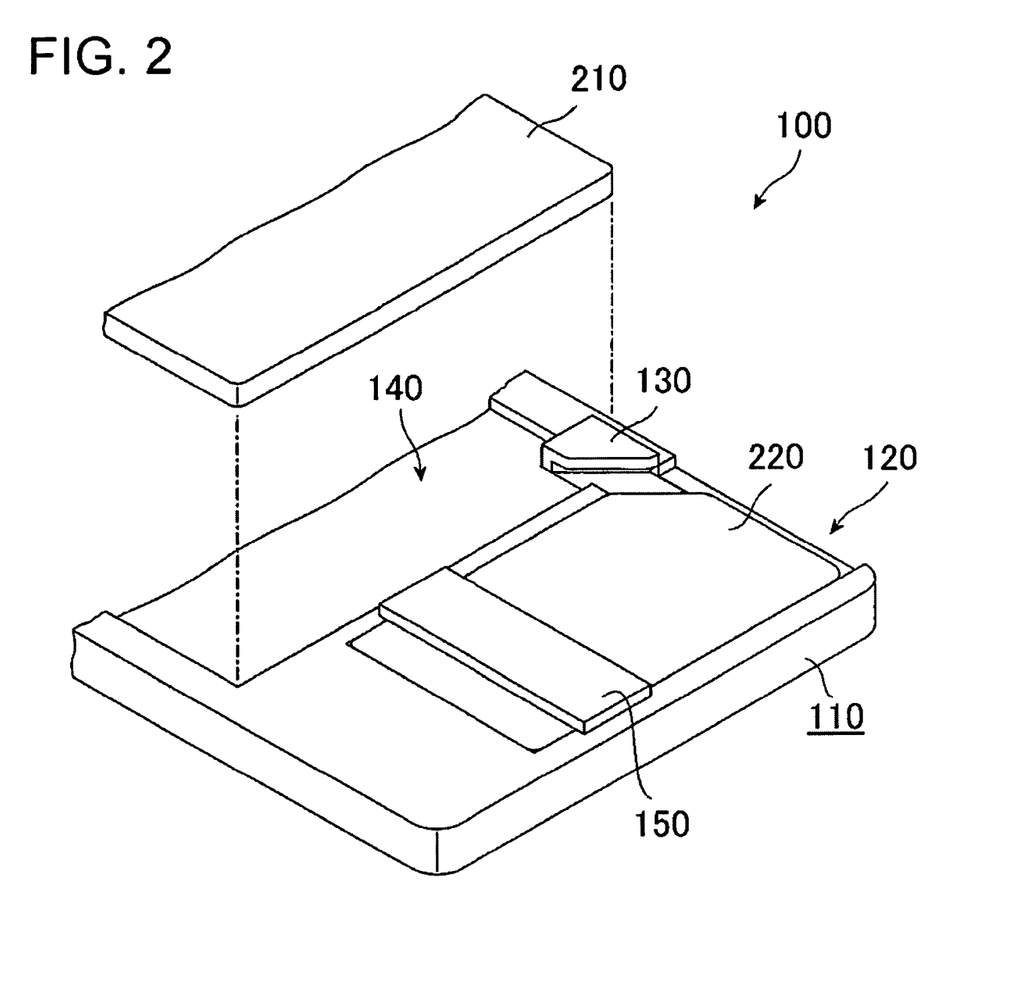
FIG. 2 is an exploded perspective view showing the electronic device main body with a SIM card, which is an electronic card medium, mounted thereon.

Also, when the battery pack 210 is removed as shown in FIGS. 2 and 3 the unit lock member 130 can freely slide, and hence the unit lock member 130 can be disengaged from the SIM card 220 as shown in FIG. 1, so that the SIM card 220 can be removed or mounted.

Thus, the mobile phone terminal 100 according to this embodiment inhibits mounting or removing the SIM card 220 while the battery pack 210 can be removably mounted. Such configuration prevents the malfunction of the SIM card 220 arising from being mounted or removed while the battery pack 210 is mounted.

Still, the battery pack 210 and the SIM card 220 can be independently located in a plane. The terminal main body 110 can therefore be made thinner. Such structure further allows confirming whether the SIM card 220 is mounted, without the need to remove the battery pack 210.

Further, the unit lock member 130 is engaged with the right-hand upper and lower surface of the SIM card 220, in addition to the right-hand end face thereof. Accordingly, the unit lock member 130 can securely retain the end portion of the SIM card 220.

In particular, the SIM card 220 is of a rectangular plate shape, with the corner 221 cut away in a triangular shape, and the unit lock member 130 is engaged with the corner 221 of the SIM card 220.

Such configuration eliminates the need to locate the unit lock member 130 farther rightward from the right-hand edge of the SIM card 220, as shown in the drawings. Accordingly, the left-to-right width of the terminal main body 110 can also be reduced.

Here, the commercially available SIM cards 220 are normally of a rectangular plate shape with the corner 221 cut away in a triangular shape. The foregoing advantageous effect can, therefore, be attained from the shape of the SIM card 220 which is popularly available.

Also, the connector unit 150, which serves for electrical connection with the SIM card 220 mounted, is formed in a frame-like shape and acts as a part of the unit retention mechanism 120. Such arrangement contributes to upgrading the performance of the unit retention mechanism 120 through a simple process of employing the connector unit 150 of a popular type.

It is to be noted that the present invention is not limited to the foregoing embodiment, but involves various modifications within the scope of the present invention. To cite a few examples, according to the embodiment the connector unit 150 to be electrically connected with the SIM card 220 is formed in a frame-like shape, and acts as a part of the unit retention mechanism 120.

Figure 6:
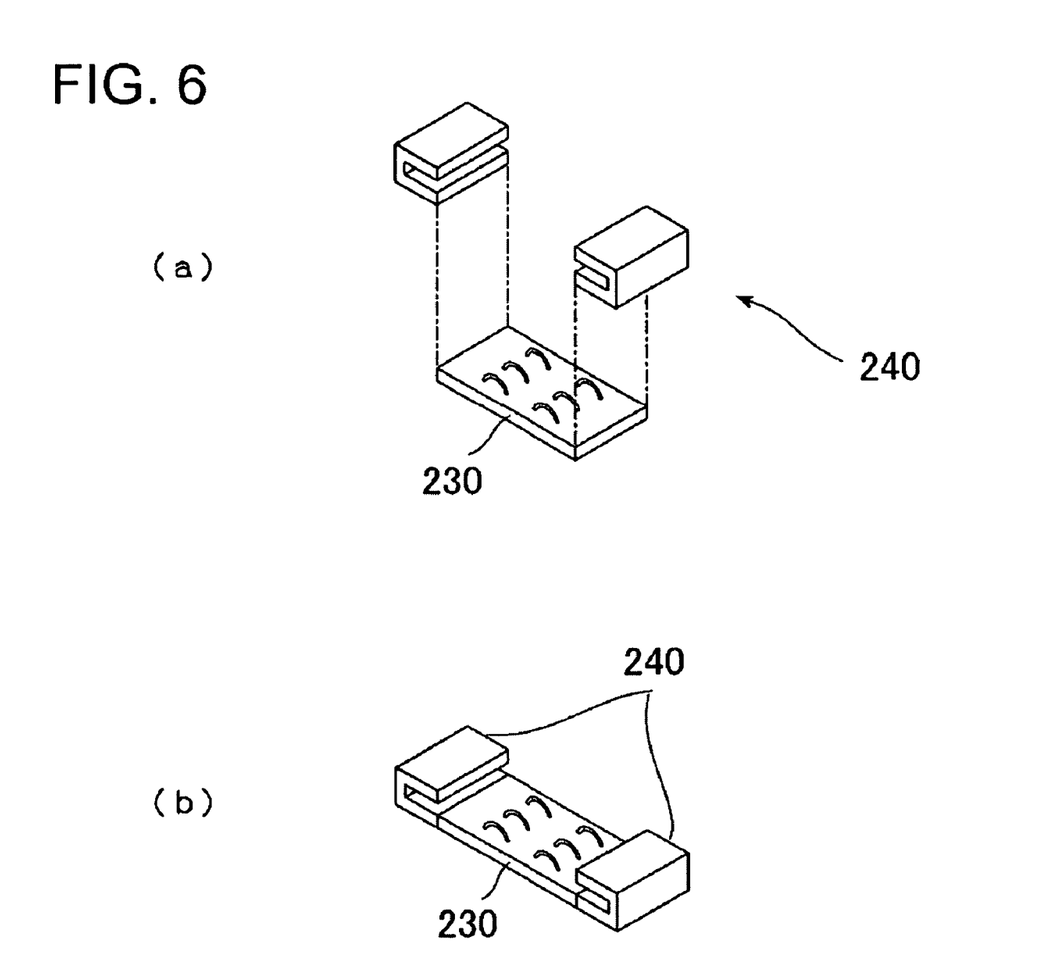
FIG. 6 is perspective views showing a structure of a connector unit and a unit retention mechanism according to a variation of the embodiment.

However, as shown in FIGS. 6(*a*) and 6(*b*), a connector unit 230 may be formed in a plate shape, and a unit retention mechanism 240 may be provided exclusively for retaining the SIM card. Such unit retention mechanism 240 may be formed as a component to be coupled with the connector unit 230, or as a part of the terminal main body 110.

Also, it is assumed that the unit lock member 130 is caused to slide by a user's finger, according to the embodiment. However, a lock biasing mechanism (not shown) may be mounted on the terminal main body 110, so as to bias the slidable unit lock member 130 in a direction of moving away from the SIM card 220.

In this case, once the battery pack 210 is removed the unit lock member 130 automatically moves away from the SIM card 220. Such structure simplifies the removal process of the SIM card 220.

On the contrary, a lock biasing mechanism (not shown) may be mounted on the terminal main body 110, so as to bias the slidable unit lock member 130 toward the SIM card 220. In this case, the SIM card 220 is automatically locked by the unit lock member 130, upon being mounted. Such structure simplifies the mounting process of the battery pack 210.

Further, according to the embodiment the unit lock member 130 includes the bottom portion 131 of a slender rectangular plate shape extending in a back and forth direction, the middle portion 132 of a triangular plate shape to be butted to the end face of the corner 221 of the SIM card 220, and the top portion 133 of a triangular plate shape projecting further backward from the middle portion 132, to be thereby engaged with the end face of the SIM card 220, as well as with the upper and lower surface thereof.

However, it suffices that the unit lock member is engaged with at least the end face of the SIM card 220. From such viewpoint, the unit lock member may only include the bottom portion and the middle portion 132, or the middle portion 132 and the top portion 133, or even only the middle portion 132 (not shown).

Still further, the embodiment refers to the case where the portable electronic apparatus is the mobile phone terminal 100 of the folding type. Nevertheless, the portable electronic apparatus may be a sliding type mobile phone terminal, a solid body type mobile phone terminal, or a Personal Digital Assistance (PDA) or an electronic dictionary, of a folding type, a sliding type, or a solid body type (not shown).

Naturally, the foregoing embodiment and the plurality of variations thereof may be combined as the case may be, unless technical contradiction arises.

The invention claimed is:

1. A portable electronic apparatus including a battery pack and an electronic card medium constituted of a card-shaped electronic device, removably mounted on a main body of said electronic apparatus, comprising:
   a unit retention mechanism in which said electronic card medium is slide-mounted from one of left and right direction;
   a unit lock member supported so as to slide in a back and forth direction, and to be engaged with at least an end face on either side of said electronic card medium mounted; and
   a battery retention mechanism in which said battery pack is removably mounted from above, at a position where said battery pack holds immobile said unit lock member engaged with said electronic card medium;
   wherein said unit lock member is engaged with an upper surface of said electronic card medium, in addition to said end face thereof.

2. The portable electronic apparatus according to claim 1, wherein said unit lock member is engaged with an upper surface and a lower surface of said electronic card medium, in addition to said end face thereof.

3. The portable electronic apparatus according to claim 1, wherein said electronic card medium is of a rectangular plate shape, with a corner on one of end portions cut away in a triangular shape; and
   said unit lock member is engaged with said corner cut away in a triangular shape of said electronic card medium.

4. The portable electronic apparatus according to claim 1, further comprising a lock biasing mechanism that biases said unit lock member slidably supported, so as to move away from said electronic card medium.

5. The portable electronic apparatus according to claim 1, further comprising a lock biasing mechanism that biases said unit lock member slidably supported, toward said electronic card medium.

6. The portable electronic apparatus according to claim 1, further comprising a connector unit to be electrically connected with said electronic card medium mounted;

wherein said unit retention mechanism constitutes an integral part of said connector unit.

7. The portable electronic apparatus according to claim 1, further comprising a connector unit to be electrically connected with said electronic card medium mounted;

wherein said unit retention mechanism is independent from said connector unit, and constitutes an integral part of said main body of said electronic apparatus.

8. The portable electronic apparatus according to claim 1, wherein said electronic card medium is a Subscriber Identity Module (SIM) card.

* * * * *